(12) United States Patent
Akutsu

(10) Patent No.: US 11,584,433 B2
(45) Date of Patent: Feb. 21, 2023

(54) ELECTRIC POWER STEERING APPARATUS AND VEHICLE MOUNTED THEREWITH

(71) Applicant: Mitsubishi Electric Corporation, Tokyo (JP)

(72) Inventor: Satoru Akutsu, Tokyo (JP)

(73) Assignee: Mitsubishi Electric Cornoration, Tokyo (JP)

( * ) Notice: Subject to any disclaimer, the term of this patent is extended or adjusted under 35 U.S.C. 154(b) by 587 days.

(21) Appl. No.: 16/489,124

(22) PCT Filed: Feb. 28, 2018

(86) PCT No.: PCT/JP2018/007451
§ 371 (c)(1),
(2) Date: Aug. 27, 2019

(87) PCT Pub. No.: WO2018/235343
PCT Pub. Date: Dec. 27, 2018

(65) Prior Publication Data
US 2020/0102007 A1    Apr. 2, 2020

(30) Foreign Application Priority Data

Jun. 22, 2017 (JP) .............................. JP2017-121905

(51) Int. Cl.
*B62D 7/15* (2006.01)
*B62D 5/04* (2006.01)
*H02P 25/22* (2006.01)

(52) U.S. Cl.
CPC ......... *B62D 7/1545* (2013.01); *B62D 5/0403* (2013.01); *H02P 25/22* (2013.01)

(58) Field of Classification Search
CPC ...... B62D 7/1545; B62D 5/0403; H02P 25/22
See application file for complete search history.

(56) References Cited

U.S. PATENT DOCUMENTS

2009/0210113 A1    8/2009  Auguet
2013/0062138 A1    3/2013  Naitou et al.
(Continued)

FOREIGN PATENT DOCUMENTS

CN    104703860 A    6/2015
EP    2 450 259 A1    5/2012
(Continued)

OTHER PUBLICATIONS

Communication dated Jul. 2, 2021 by the China National Intellectual Property Administration in application No. 201880040086.7.
(Continued)

*Primary Examiner* — Jacob D Knutson
(74) *Attorney, Agent, or Firm* — Sughrue Mion, PLLC; Richard C. Turner

(57) ABSTRACT

An electric power steering apparatus having independent turning mechanisms for respective four wheels of a vehicle, has a problem in that, when a turning motor fails, a turning mechanism for a corresponding wheel stops functioning, resulting in reduction in the maneuverability and the stability of the vehicle. Turning motors of turning mechanisms independently disposed for respective four wheels of a vehicle, each have a redundant configuration. Specifically, each turning motor is configured as three-phase duplexing motors having two three-phase windings and two inverters for separately driving the three-phase windings.

4 Claims, 3 Drawing Sheets

(56) References Cited

U.S. PATENT DOCUMENTS

| | | | |
|---|---|---|---|
| 2013/0285591 A1* | 10/2013 | Suzuki | H02P 21/22 |
| | | | 318/724 |
| 2013/0299271 A1* | 11/2013 | Endo | B62D 5/046 |
| | | | 180/446 |
| 2014/0222292 A1* | 8/2014 | Fisher | B62D 5/0481 |
| | | | 701/41 |
| 2015/0021266 A1 | 1/2015 | Yoshida et al. | |
| 2015/0083508 A1 | 3/2015 | Bluethmann et al. | |
| 2015/0232119 A1 | 8/2015 | Ferrer-Dalmau Nieto et al. | |
| 2016/0218598 A1* | 7/2016 | Hayashi | H02K 11/33 |
| 2017/0349207 A1* | 12/2017 | Maeshima | B60L 3/0092 |

FOREIGN PATENT DOCUMENTS

| | | | | |
|---|---|---|---|---|
| EP | 2894078 A1 | | 7/2015 | |
| EP | 3 053 806 A1 | | 8/2016 | |
| FR | 2887839 A1 | | 1/2007 | |
| GB | 2213441 A | * | 8/1989 | B62D 7/148 |
| JP | 6-293276 A | | 10/1994 | |
| JP | 2000-300968 A | | 10/2000 | |
| JP | 2008-544917 A | | 12/2008 | |
| JP | 2008544917 A | * | 12/2008 | |
| JP | 2013-059208 A | | 3/2013 | |
| JP | 2013-159165 A | | 8/2013 | |
| JP | 2013-202472 A | | 10/2013 | |
| JP | 2015082885 A | * | 4/2015 | |
| JP | 2016077125 A | * | 5/2016 | |
| WO | WO-2016132450 A1 | * | 8/2016 | B62D 5/0484 |

OTHER PUBLICATIONS

Communication dated Dec. 20, 2021 from the European Patent Office in EP Application No. 18 821 273.2.
International Search Report for PCT/JP2018/007451 dated May 29, 2018 (PCT/ISA/210).
Intellectual Property of India, Communication dated Jul. 13, 2020 issued in Application No. 201927038355.
European Search Report dated Jul. 2, 2020 in European Application No. 18821273.2.
Chinese Office Action dated Jan. 29, 2022 in Patent Application No. 201880040086.7.
Office Action dated Jun. 16, 2022 in Chinese Application No. 201880040086.7.
Son Al Chun et al., "Technologies for the Hybrid Electric Drive System of Armored Vehicles (Second Edition)", Beijing: National Defense Engineering, Sangyo Publishing Co., Ltd., Dec. 2016, pp. 113-115 (12 pages total).

* cited by examiner

ELECTRIC POWER STEERING APPARATUS AND VEHICLE MOUNTED THEREWITH

CROSS REFERENCE TO RELATED APPLICATIONS

This application is a National Stage of International Application No. PCT/JP2018/007451 filed Feb. 28, 2018, claiming priority based on Japanese Patent Application No. 2017-121905 filed Jun. 22, 2017.

TECHNICAL FIELD

The present disclosure relates to an electric power steering apparatus having independent turning mechanisms for respective four wheels of a vehicle, and a vehicle mounted with the electric power steering apparatus.

BACKGROUND ART

Conventional electric power steering apparatuses having independent turning mechanisms for respective four wheels of a vehicle, do not have any backup function for a case of a failure of any of turning motors which compose the turning mechanisms (see, for example, Patent Document 1).

CITATION LIST

Patent Document

Patent Document 1: Japanese Laid-Open Patent Publication No. 2005-112008

SUMMARY OF THE INVENTION

Problems to be Solved by the Invention

A conventional electric power steering apparatus, for a vehicle, that is described in Patent Document 1 has independent turning mechanisms for four wheels. The electric power steering apparatus has a problem in that, when a turning motor fails, a turning mechanism for a corresponding wheel stops functioning, resulting in reduction in the maneuverability and the stability of the vehicle.

The present disclosure has been made to solve the above problem, and an object of the present disclosure is to obtain an electric power steering apparatus that enables, even when a turning motor fails, a turning mechanism for a corresponding wheel to continue functioning, thereby ensuring the maneuverability and the stability of the vehicle.

Solution to the Problems

An electric power steering apparatus disclosed in the present disclosure is an electric power steering apparatus having independent turning mechanisms for respective four wheels of a vehicle, wherein turning motors of the turning mechanisms have redundant configurations.

Effect of the Invention

According to the present disclosure, even when any of the turning motors fails, the turning mechanism for a corresponding wheel can continue functioning. Thus, it is possible to obtain an electric power steering apparatus that has improved safety and that is capable of ensuring the maneuverability and the stability of the vehicle.

DESCRIPTION OF EMBODIMENTS

Embodiment 1

Hereinafter, an electric power steering apparatus according to embodiment 1 will be described with reference to FIG. 1 and FIG. 2.

Figure 1:
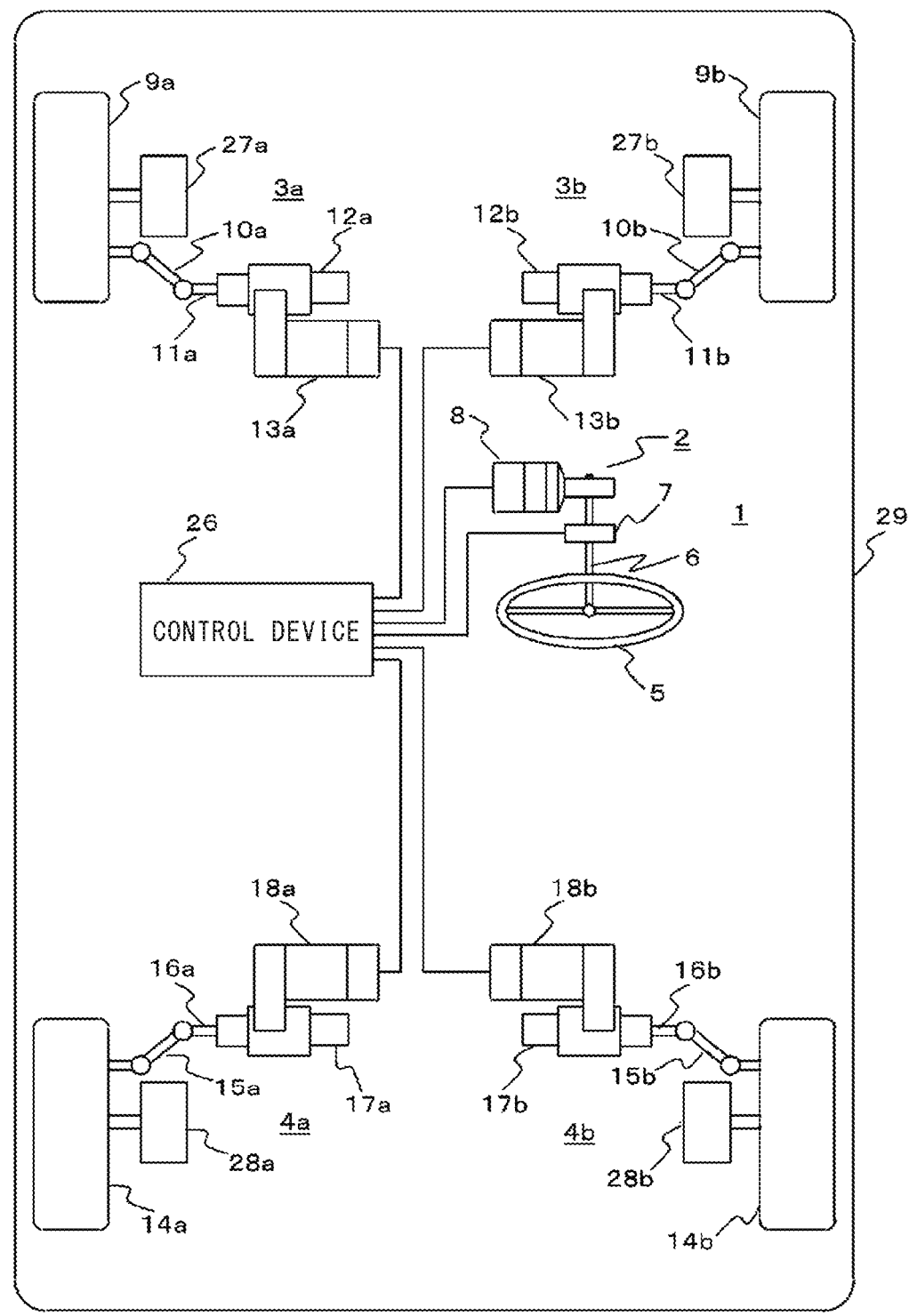
FIG. 1 shows a system configuration diagram of an electric power steering apparatus according to embodiment 1.
Figure 2:
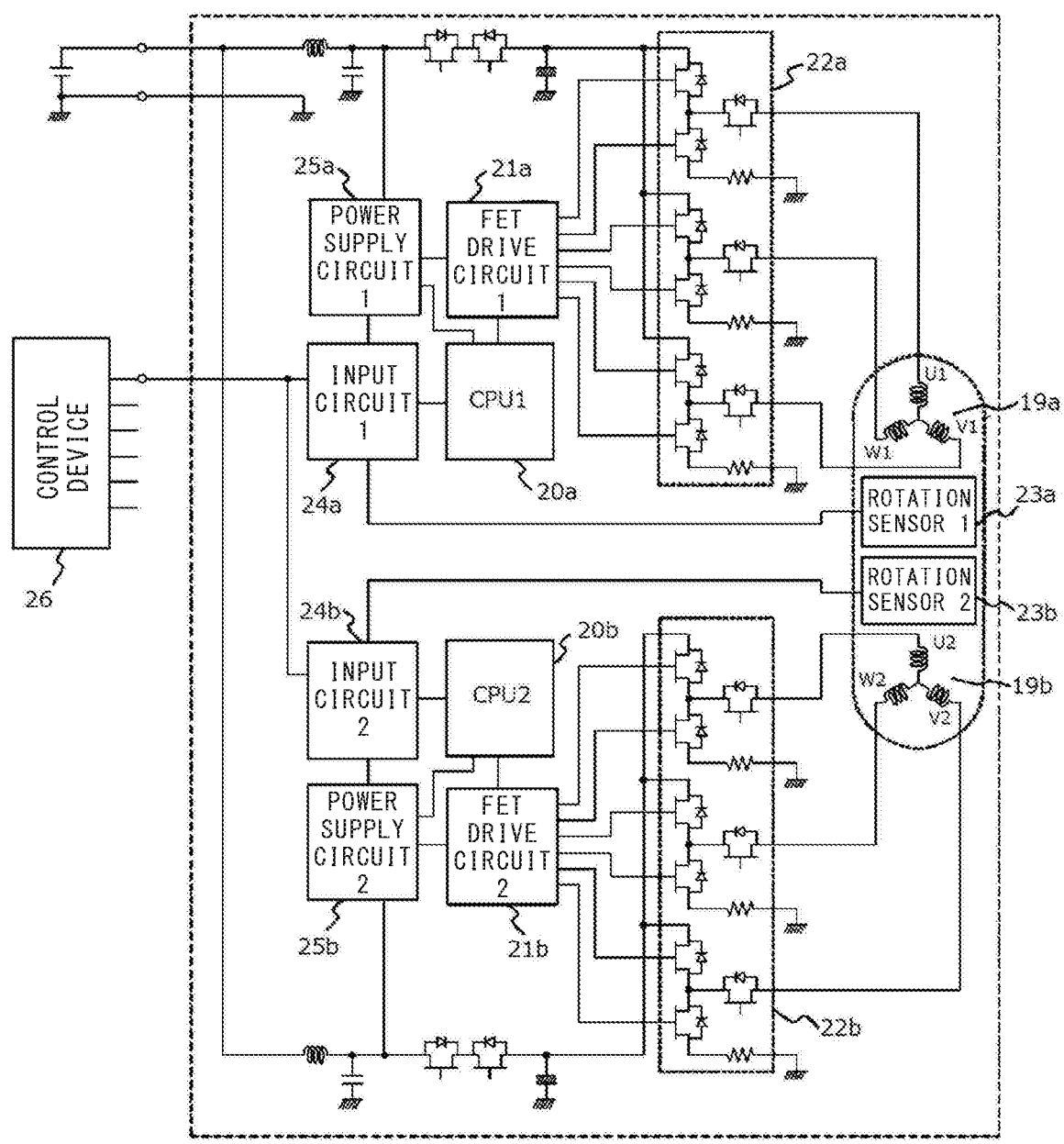
FIG. 2 is a circuit diagram of a turning motor of a turning mechanism used in the electric power steering apparatus according to embodiment 1.

FIG. 1 shows a system configuration diagram of the electric power steering apparatus according to embodiment 1, and FIG. 2 is a circuit diagram of a turning motor of a turning mechanism used in the electric power steering apparatus according to embodiment 1.

In FIG. 1, a steering shaft 6 is coupled to a steering wheel 5 which is to be manipulated by a driver, and a steering sensor 7 for detecting the angle of steering made by the driver and a reaction force motor 8 for exerting steering reaction force against the steering made by the driver are mounted to the steering shaft 6. The steering wheel 5, the steering shaft 6, the steering sensor 7, and the reaction force motor 8 form a steering input mechanism 2.

A left front wheel tie rod 11a coupled to a left front wheel rack shaft 12a is connected to a left front wheel knuckle arm 10a of a left front wheel 9a. When the movement of the left front wheel rack shaft 12a is transmitted through the left front wheel tie rod 11a and the left front wheel knuckle arm 10a to the left front wheel 9a, the left front wheel 9a is turned. A left front wheel turning motor 13a is mounted to the left front wheel rack shaft 12a, and the output of the left front wheel turning motor 13a serves as power for moving the left front wheel rack shaft 12a. A mechanism including the left front wheel rack shaft and the components disposed therearound, serves as a left front wheel turning mechanism 3a.

Similarly, a right front wheel tie rod 11b coupled to a right front wheel rack shaft 12b is connected to a right front wheel knuckle arm 10b of a right front wheel 9b. When the movement of the right front wheel rack shaft 12b is transmitted through the right front wheel tie rod 11b and the right front wheel knuckle arm 10b to the right front wheel 9b, the right front wheel 9b is turned. A right front wheel turning motor 13b is mounted to the right front wheel rack shaft 12b, and the output of the right front wheel turning motor 13b serves as power for moving the right front wheel rack shaft 12b. A mechanism including the right front wheel rack shaft and the components disposed therearound, serves as a right front wheel turning mechanism 3b.

A left rear wheel tie rod 16a coupled to a left rear wheel rack shaft 17a is connected to a left rear wheel knuckle arm 15a of a left rear wheel 14a. When the movement of the left rear wheel rack shaft 17a is transmitted through the left rear wheel tie rod 16a and the left rear wheel knuckle arm 15a to the left rear wheel 14a, the left rear wheel 14a is turned. A left rear wheel turning motor 18a is mounted to the left rear wheel rack shaft 17a, and the output of the left rear wheel turning motor 18a serves as power for moving the left rear wheel rack shaft 17a. A mechanism including the left rear wheel rack shaft and the components disposed therearound, serves as a left rear wheel turning mechanism 4a.

Similarly, a right rear wheel tie rod 16b coupled to a right rear wheel rack shaft 17b is connected to a right rear wheel knuckle arm 15b of a right rear wheel 14b. When the movement of the right rear wheel rack shaft 17b is transmitted through the right rear wheel tie rod 16b and the right rear wheel knuckle arm 15b to the right rear wheel 14b, the right rear wheel 14b is turned. A right rear wheel turning motor 18b is mounted to the right rear wheel rack shaft 17b, and the output of the right rear wheel turning motor 18b serves as power for moving the right rear wheel rack shaft 17b. A mechanism including the right rear wheel rack shaft and the components disposed therearound, serves as a right rear wheel turning mechanism 4b.

The steering input mechanism 2 and each of the turning mechanisms 3a, 3b, 4a, and 4b are not mechanically connected to each other, but a configuration is employed in which a control device 26 appropriately controls the left front wheel turning motor 13a, the right front wheel turning motor 13b, the reaction force motor 8, the left rear wheel turning motor 18a, and the right rear wheel turning motor 18b on the basis of input signals from the steering sensor 7 and the like, thereby performing turning in accordance with a manipulation made by the driver. That is, an electric power steering apparatus 1 uses a so-called steer-by-wire system.

Further, a left front wheel drive device 27a, a right front wheel drive device 27b, a left rear wheel drive device 28a, and a right rear wheel drive device 28b are independently provided to the left front wheel 9a, the right front wheel 9b, the left rear wheel 14a, and the right rear wheel 14b, respectively. The drive devices are configured to separately supply driving force to the respective wheels. In this manner, in the present configuration, the turning mechanisms for the four wheels of a vehicle 29 are independent of one another, and, in accordance with the running state, the turning angles of the four wheels can be freely controlled and driving force of the four wheels can also be freely controlled, whereby the present configuration allows a vehicle to have high maneuverability and high behavior stability.

The left front wheel turning motor 13a, the right front wheel turning motor 13b, the left rear wheel turning motor 18a, and the right rear wheel turning motor 18b each have a redundant configuration. Specifically, each of the turning motors 13a, 13b, 18a, and 18b is configured as double-inverter type three-phase duplexing motors having two three-phase windings and two inverters for separately driving respective three-phase windings, and thus is configured so as not to completely lose the function as a motor even when a failure occurs.

Next, the configuration of the double-inverter type three-phase duplexing motors will be described with reference to FIG. 2, with one of the turning motors being used as an example.

In FIG. 2, the turning motor includes two three-phase windings 19a and 19b. Connection terminals U1, V1, and W1 of the three-phase winding 19a of a first system are connected to a first inverter 22a which is controlled by a CPU 20a and an FET drive circuit 21a. Similarly, connection terminals U2, V2, and W2 of the three-phase winding 19b of a second system are connected to a second inverter 22b which is controlled by a CPU 20b and an FET drive circuit 21b.

A signal from a rotation sensor 23a for detecting rotation of a rotor of the turning motor is inputted to an input circuit 24a of the first system, and used for controlling the motor. Power is supplied from a power supply circuit 25a to the CPU 20a, the FET drive circuit 21a, and the input circuit 24a. A power supply of the vehicle is connected to the first inverter 22a such that power for driving the motor is supplied from the power supply.

Similarly, a signal from a rotation sensor 23b is inputted to an input circuit 24b of the second system, and used for controlling the motor. Power is supplied from a power supply circuit 25b to the CPU 20b, the FET drive circuit 21b, and the input circuit 24b. The power supply of the vehicle is connected to the second inverter 22b such that power for driving the motor is supplied from the power supply. The input circuit 24a and the input circuit 24b are connected to the control device 26, and the motor is controlled by the control device 26 in coordination with the other three turning motors, the reaction force motor 8, and another vehicle system.

Here, the redundant configuration of the turning motor refers to a state where the two three-phase windings 19a and 19b of the first system and the second system are driven together, and the two inverters 22a and 22b of the first system and the second system are driven together, even when the double-inverter type three-phase duplexing motors serving as the turning motor are normal.

Next, operations of the double-inverter type three-phase duplexing motors at the time of a failure thereof will be described, with the case of occurrence of a failure in the second system of the left rear wheel turning motor 18a being used as an example. When the CPU 20b detects a failure in the second system, the CPU 20b stops the FET drive circuit 21b from being driven such that the drive current of the three-phase winding 19b of the second system becomes zero. Accordingly, torque that is generated in the second system becomes 0, and the output torque of the entire motor becomes half the output torque, of the entire motor, that is obtained in a normal case. However, owing to the torque of the first system, the turning motor does not completely lose the function, but can continue the turning. At this time, the CPU 20b transmits information about the failure via the input circuit 24b to the control device 26 such that the other three turning motors 13a, 13b, and 18b, the reaction force motor 8, and the other vehicle system are appropriately controlled.

In addition, at the same time as the stoppage of drive of the second system, control may be performed in which drive current in the first system is increased to twice the drive current obtained in a normal case, thereby doubling also the torque that is generated in the first system. With the doubling, the torque having been generated in the second system is compensated for, whereby the output torque of the entire motor can be made unchanged from the output torque thereof obtained in a normal case.

In addition, after the stoppage of drive of the second system, the turning angle of the left rear wheel may be returned to and fixed at the neutral position by the first system, and thereafter, steering may be performed only with the front wheels. At this time, the turning angle of the right rear wheel which is normal, is also returned to and fixed at the neutral position.

Furthermore, reduction in the maneuverability due to the fixation of the turning angle at the neutral position may be compensated for by controlling driving force of the four wheels. For example, by generating a difference in driving force between the left and right wheels, a yaw moment is generated, whereby the vehicle can be assisted in steering.

In the electric power steering apparatus according to the embodiment configured as described above, even when any of the turning motors fails, the turning motor can continue functioning. Therefore, it is possible to avoid a situation in which, as in a conventional apparatus, a wheel stops in a state of being turned at the time of a failure, resulting in reduction in the maneuverability and the behavior stability of the vehicle. Consequently, the safety of the vehicle can be improved.

In addition, in the present embodiment, two CPUs are used in the configuration of the double-inverter type motors. However, the number of the CPUs may be one. Furthermore, the type of the motor is not limited to the three-phase type.

Figure 3:
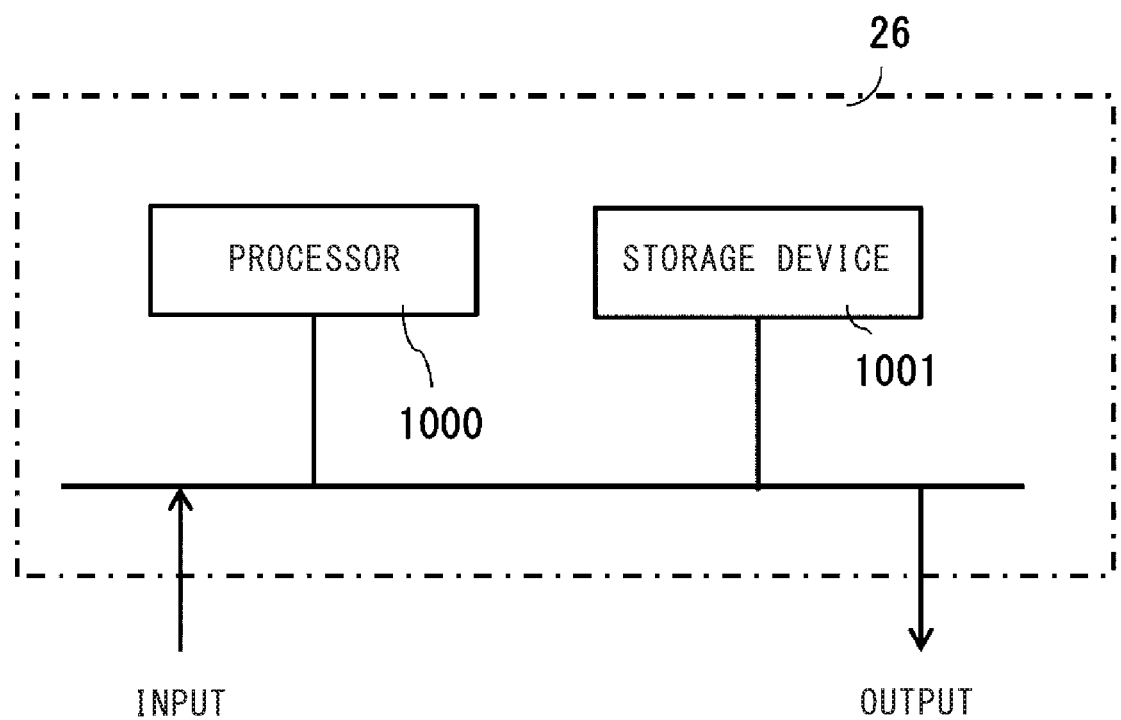
FIG. 3 is a diagram indicating an example of hardware of a control device in embodiment 1.

As shown in a hardware example in FIG. 3, the control device 26 is configured from a processor 1000 and a storage device 1001. Although not shown, the storage device includes a volatile storage device such as a random access memory, and a nonvolatile auxiliary storage device such as a flash memory. Alternatively, the storage device may include, as the auxiliary storage device, a hard disk instead of a flash memory. The processor 1000 executes a program inputted from the storage device 1001. In this case, the program is inputted from the auxiliary storage device via the volatile storage device to the processor 1000. The processor 1000 may output data of a calculation result or the like to the volatile storage device of the storage device 1001, or may store the data in the auxiliary storage device via the volatile storage device.

Although the disclosure is described above in terms of an exemplary embodiment, it should be understood that the various features, aspects and functionality described in the embodiment are not limited in their applicability to the particular embodiment with which they are described, but instead can be applied alone or in various combinations to the embodiment of the disclosure.

It is therefore understood that numerous modifications which have not been exemplified can be devised without departing from the scope of the present disclosure. For example, at least one of the constituent components may be modified, added, or eliminated.

DESCRIPTION OF THE REFERENCE CHARACTERS 1 electric power steering apparatus
2 steering input mechanism
3a left front wheel turning mechanism
3b right front wheel turning mechanism
4a left rear wheel turning mechanism
4b right rear wheel turning mechanism
5 steering wheel
6 steering shaft
7 steering sensor
8 reaction force motor
9a left front wheel
9b right front wheel
10a left front wheel knuckle arm
10b right front wheel knuckle arm
11a left front wheel tie rod
11b right front wheel tie rod
12a left front wheel rack shaft
12b right front wheel rack shaft
13a left front wheel turning motor
13b right front wheel turning motor
14a left rear wheel
14b right rear wheel
15a left rear wheel knuckle arm
15b right rear wheel knuckle arm
16a left rear wheel tie rod
16b right rear wheel tie rod
17a left rear wheel rack shaft
17b right rear wheel rack shaft
18a left rear wheel turning motor
18b right rear wheel turning motor
19a three-phase winding of first system
19b three-phase winding of second system
20a CPU
20b CPU
21a FET drive circuit
21b FET drive circuit
22a first inverter
22b second inverter
23a rotation sensor
23b rotation sensor
24a input circuit
24b input circuit
25a power supply circuit
25b power supply circuit
26 control device
27a left front wheel drive device
27b right front wheel drive device
28a left rear wheel drive device
28b right rear wheel drive device
29 vehicle

The invention claimed is:

1. An electric power steering apparatus having independent turning mechanisms for respective four wheels of a vehicle, wherein
a turning motor of each of the turning mechanisms has a redundant configuration,
wherein the turning motor is configured as three-phase duplexing motors having two three-phase windings, two inverters, two power source circuits, and two FET drive circuits for separately driving the three-phase windings, and
wherein, when one of the three-phase duplexing motors fails, the three-phase duplexing motor that has failed is stopped from being driven, and a turning angle of a wheel that is turned by the three phase duplexing motor that has failed, is fixed at a neutral position, and
wherein, when the turning angle of the wheel that is turned by the three phase duplexing motor that has failed is fixed at a neutral position, a driving force applied to said wheel is controlled to generate a yaw moment which assists steering.

2. The electric power steering apparatus according to claim 1, wherein,
when one of the three-phase duplexing motors fails, the three-phase duplexing motor that has failed is stopped from being driven, and drive current of the other three-phase duplexing motor is increased to twice the drive current obtained in a normal case.

3. A vehicle mounted with the electric power steering apparatus according to claim 1.

4. A vehicle mounted with the electric power steering apparatus according to claim 2.

* * * * *